United States Patent [19]

Shimamura

[11] Patent Number: 4,885,982

[45] Date of Patent: Dec. 12, 1989

[54] VACUUM-TYPE BRAKE BOOSTER DEVICE HAVING IMPROVED EASE OF MOUNTING

[75] Inventor: Morihiko Shimamura, Saitama, Japan

[73] Assignee: Jidosha Kiki Co., Ltd., Tokyo, Japan

[21] Appl. No.: 621,309

[22] Filed: Jun. 15, 1984

[30] Foreign Application Priority Data

Jul. 11, 1983 [JP] Japan ............................. 58-125828

[51] Int. Cl.$^4$ ............................................ F01B 11/00
[52] U.S. Cl. .................... 60/547.1; 92/98 D;
92/169.1; 92/177
[58] Field of Search ...................... 91/376 R; 92/169.2,
92/169.3, 169.4, 169, 98 D, 105 PR, 177;
60/547.1, 547.2, 547.3; 303/114; 180/90

[56] References Cited

U.S. PATENT DOCUMENTS 2,896,586  7/1959  Ayers, Jr. ............................. 92/42
4,400,943  8/1983  Belart .................................. 60/547.1
4,434,707  3/1984  Takeuchi et al. ................... 92/98 D

FOREIGN PATENT DOCUMENTS 1277541 10/1961  France ................................. 92/177
2130670  6/1984  United Kingdom ................. 92/177

Primary Examiner—Robert E. Garrett
Assistant Examiner—Mark A. Williamson
Attorney, Agent, or Firm—Sughrue, Mion, Zinn, Macpeak & Seas

[57] ABSTRACT

A vacuum-type brake booster device for automotive use having a shape such that the mounting of the booster device and surrounding components inside the engine compartment of the vehicle is markedly eased. The shell of the booster device, and hence the diaphragm contained therein, has the shape in the plane of the diaphragm of a circle having a peripheral segment thereof removed. This causes the effective center of the diaphragm to be shifted from the center of the circle. The input and output shafts and the master cylinder are mounted on the shell aligned with the offset effective center of the diaphragm.

3 Claims, 5 Drawing Sheets

VACUUM-TYPE BRAKE BOOSTER DEVICE HAVING IMPROVED EASE OF MOUNTING

BACKGROUND OF THE INVENTION

The present invention relates to a vacuum-type brake booster device for automotive use. More particularly, the invention relates to such a vacuum-type brake booster device which can easily be mounted, such as during the manufacture and repair of the vehicle, and which provides reduced interference with the mounting of other components of the vehicle.

A vacuum-type brake booster device is generally mounted on the front surface of the fire wall of the vehicle, behind the wheel well and adjacent the rear end of the engine. The brake master cylinder is mounted on the forward end of the booster. Conventionally, it has been difficult to mount the booster device and master cylinder due to interference with other components of the vehicle, such as suspension components which are mounted at the adjacent wheel well.

To overcome this difficulty, vacuum-type brake boosters have been proposed in which the shell or housing of the booster is made noncircular in cross section to thereby prevent side portions of the shell from interfering with the mounting of the device and the mounting of other components. Examples of such devices are shown in U.S. Pat. No. 2,896,586, issued July 28, 1959 to Ayers, Jr., and U.S. Pat. No. 4,434,707, issued Mar. 6, 1984 to Takeuchi et al. Although some advantages may be attained using such an approach, nevertheless, such vacuum-type brake boosters suffer from a drawback in that the effective pressure receiving area of the booster is excessively great.

SUMMARY OF THE INVENTION

Accordingly, it is an object of the present invention to provide a vacuum-type brake booster device for automotive use in which the above-discussed disadvantages have been eliminated.

Specifically, it is an object of the present invention to provide a vacuum-type brake booster device having easier mounting, which does not interfere with the mounting of adjacent components, and which does not have an overly large pressure receiving area.

In accordance with the above and other objects, the invention provides a vacuum-type brake booster device for automotive use in which the shell of the device, and hence the diaphragm of the device, are formed with a cross-sectional configuration which has symmetry in at most one axis in the plane of the diaphragm. Specifically, it is preferred that the cross-sectional shape of the shell and diaphragm be that of a circle having a cut-out segment. In this case, the effective center of the pressure receiving surface of the diaphragm of the booster device is offset from the center of the circle. The operating rods of the booster device and the master cylinder are centered on an axis extending through this offset center. Accordingly, interference with adjacent engine and vehicle body components is reduced, and the ease of mounting of the brake booster device itself is improved.

DESCRIPTION OF THE PREFERRED EMBODIMENTS

Figure 1:
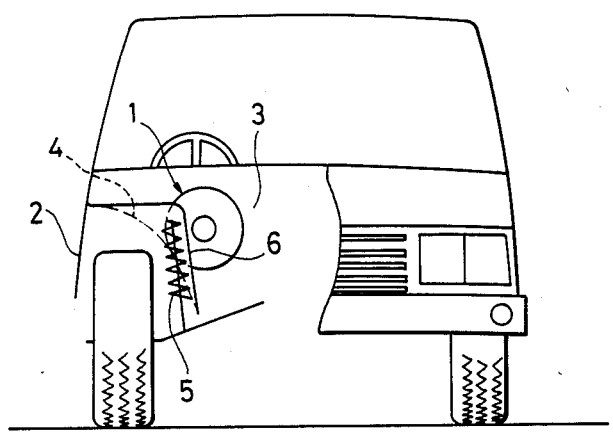
FIG. 1 is a fragmentary front view illustrating the mounting of a brake booster device in an automotive vehicle.
Figure 2:
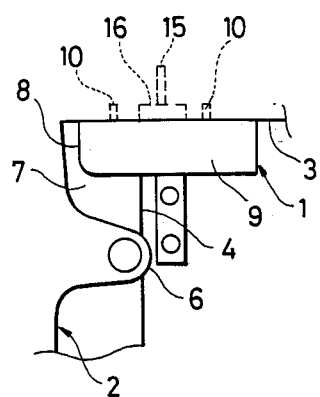
FIG. 2 is a schematic plan view taken from above of a vacuum-type brake booster device mounted in an engine compartment.

Referring first to FIGS. 1 and 2, the mounting of a brake booster in an automotive vehicle will be described The brake booster device 1 is mounted on the front surface of the fire wall 3 of the engine compartment of the vehicle 2. The brake booster device 1 is mounted rearwardly of the cover 6 of, for instance, the front right wheel well 4, the latter including strut-type front suspension components 5. As seen in FIG. 2, the cover 6 has a concave portion 7 to the rear of the area where the suspension components 5 join the upper surface of the wheel well 4.

In accordance with the invention, the shell 9 of the vacuum-type brake booster device has a generally circular shape in cross section, but with the circular shape being interrupted by an indented portion 8. The brake booster device 1 is mounted by bolts 10 on the fire wall 3 so that the indented portion 8 is adjacent the side of the wheel well 4. As is usual, an input shaft 15 and a valve body 16 extend rearwardly from the booster device 1 through a hole in the fire wall 3. The input shaft 15, of course, connects with a brake pedal.

Figure 3:
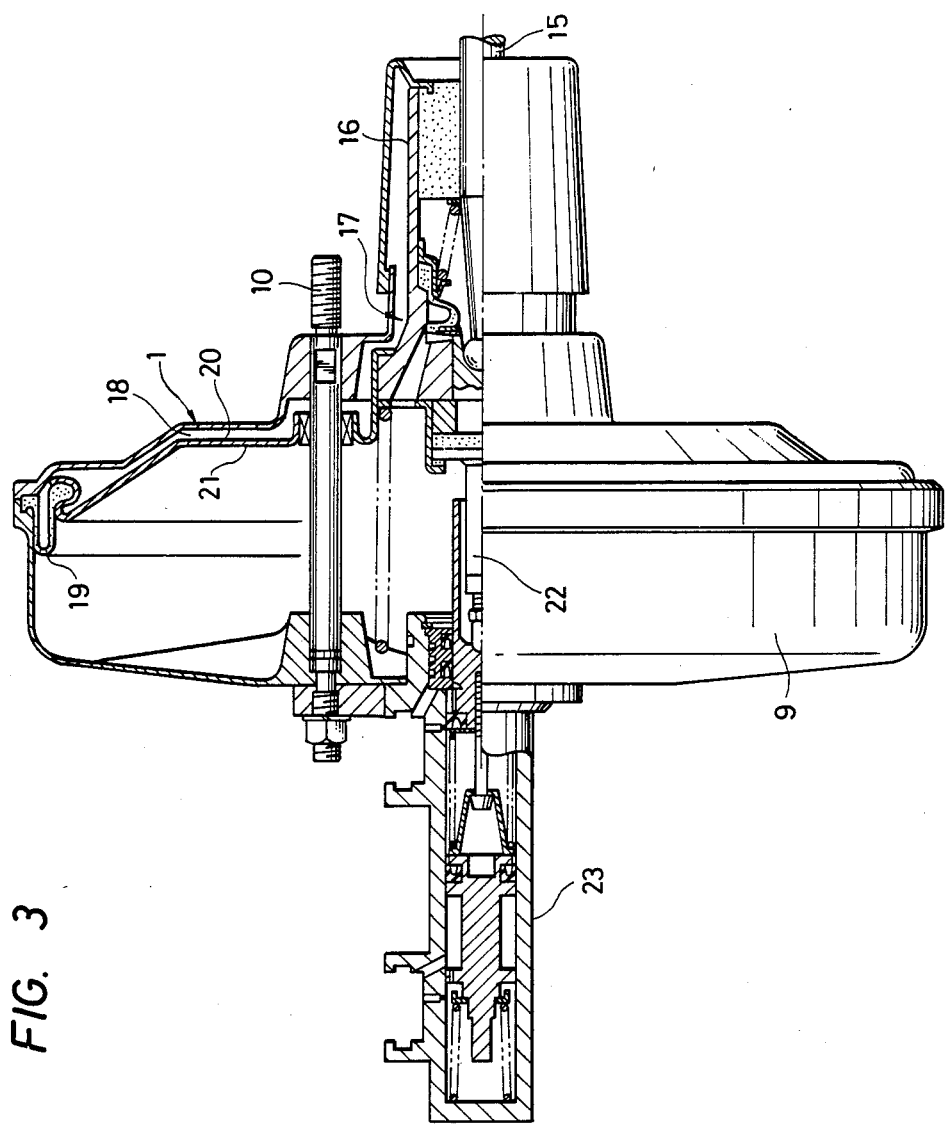
FIG. 3 is an enlarged, partially sectional view of a vacuum-type brake booster device of the invention.

Referring now to FIG. 3, the construction of the vacuum-type brake booster device of the invention will be described in more detail. The input shaft 15 extends through the valve body 16 and connects with a valve mechanism 17. When a force is applied to the input shaft 15 by pressing on the brake pedal, the input shaft 15 is moved to control the fluid pressure introduced into a chamber 18 defined at the rear of the diaphragm 20 of a power piston assembly 21, as is well known. The effect is to amplify the force applied to the input rod 15, and to transmit the amplified force via an output shaft 22 to a master cylinder 23, the latter being mounted at the front end of the shell 9 in this embodiment.

Figure 4:
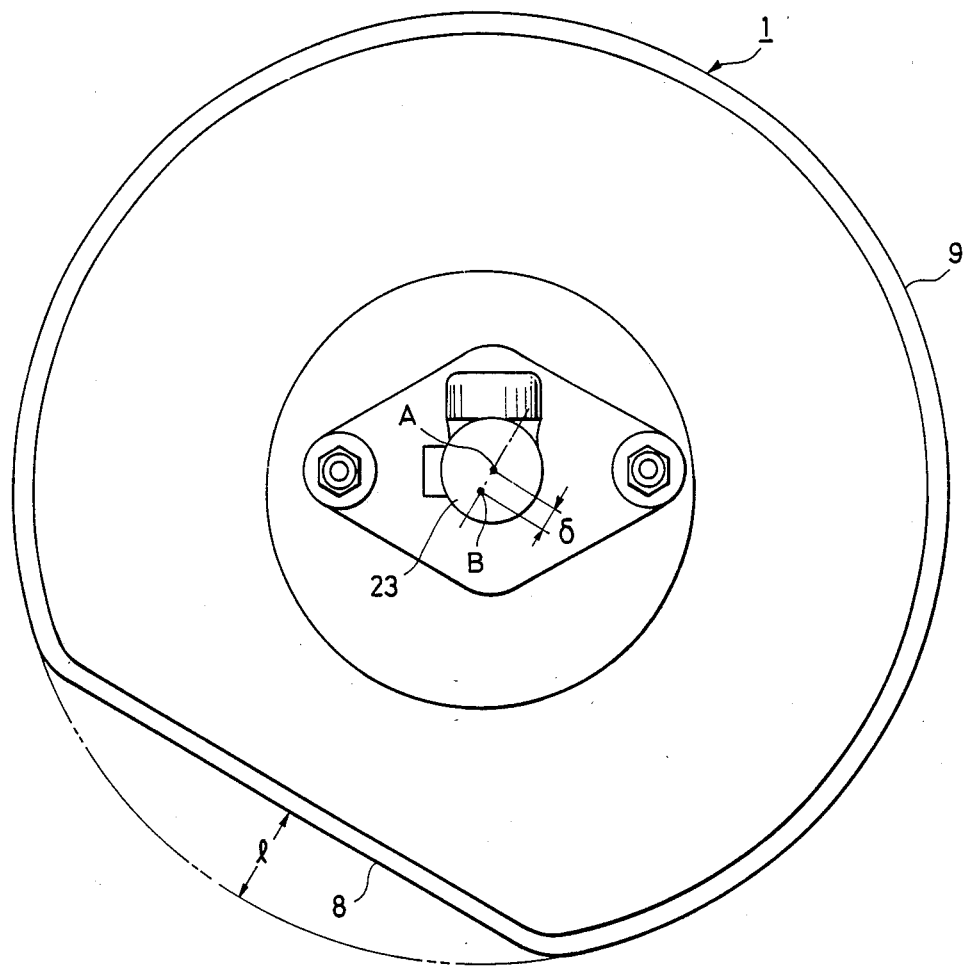
FIG. 4 is a front view of the brake booster device of FIG. 3.

As shown in FIG. 4, the shell 9 of the vacuum-type brake booster device 1 is generally circular but has an indented portion 8 where the line defining the edge of the shell 9, and hence the diaphragm 20, extends along a chord offset from the edge of the circle defined by the other portions of the shell 9 by a distance l. That is, the shell 9 and diaphragm 20 have symmetry along only one axis in the plane parallel to the surface of the diaphragm This causes the effective center of the diaphragm 20 (the center of the area where the pressure acts) to be offset, as shown in FIG. 4, from the center B of the aforementioned circle to a position A displaced by a distance δ. In accordance with one important aspect of the invention, the axes of the input and output shafts 15 and 22, respectively, are aligned with the effective pressure center point . Accordingly, the master cylinder 23 is offset from the center B of the circle by the distance δ.

As an example, if the outer diameter of the circular portion of the shell 9 is 205 mm and the distance l is 40 mm, the offset δ from the center B of the circle is 12 mm. As may be appreciated from the diagram of FIG. 2, this means that the master cylinder is moved 12 mm further away from the edge of the cover 6 of the wheel well 4 and the suspension components 5 than was possible using a conventional brake booster device Additionally, in the example given, it is necessary to reduce the pressure receiving surface area of the diaphragm by only 13%, which is one half that required in the case where the shell of the booster device is made elliptical or oval, as in the prior art approaches described above.

Figure 5:
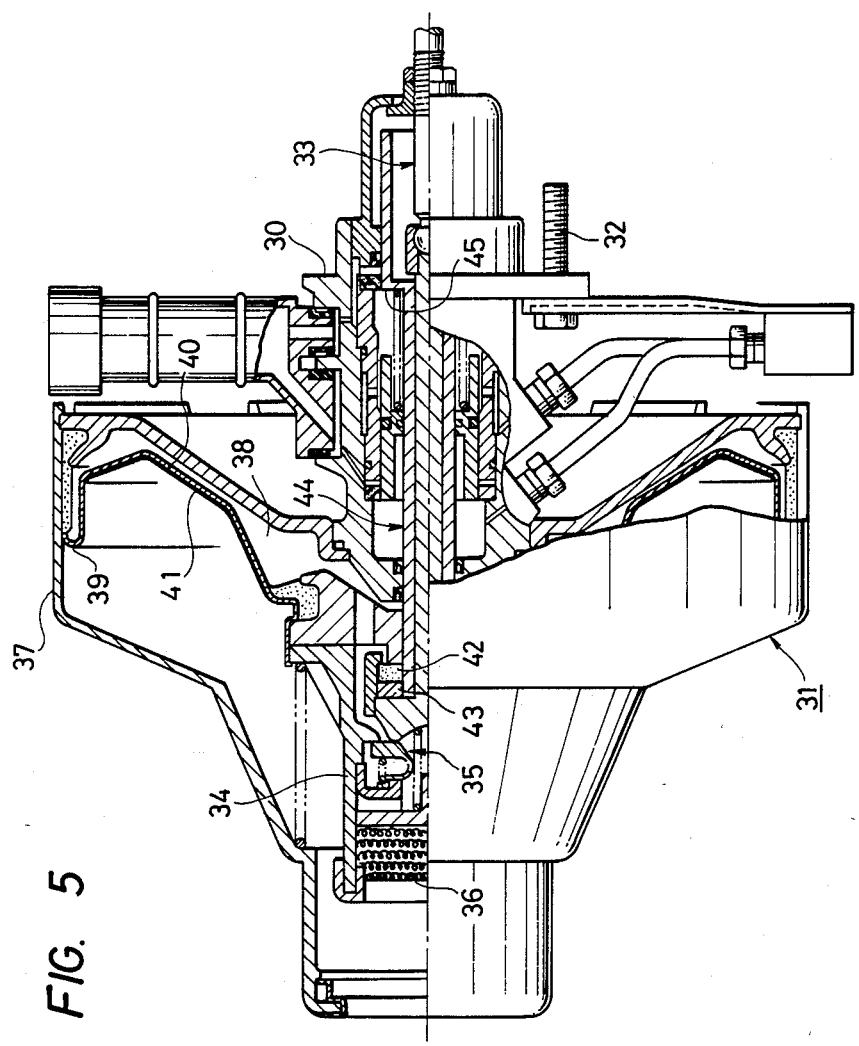
FIG. 5 is a view similar to that of FIG. 3 but showing another embodiment of a brake booster device of the invention.
Figure 6:
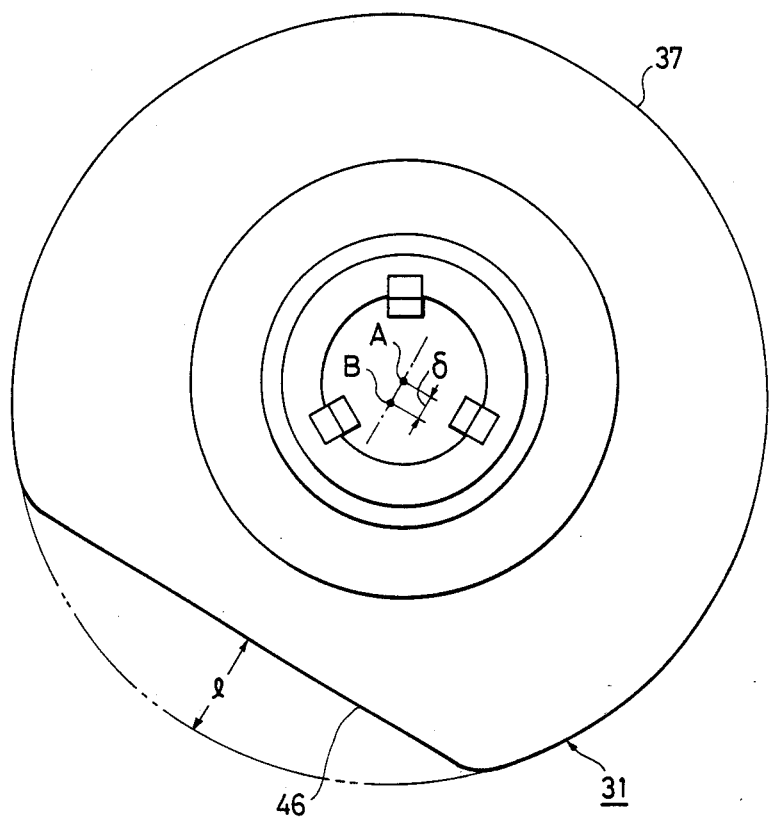
FIG. 6 is a front view of the brake booster device of the embodiment of FIG. 5.

FIGS. 5 and 6 show an alternative embodiment of the invention. In this embodiment, the master cylinder 30 is provided on the side of the fire wall 3, that is, on the side opposite that employed in the first-described embodiment. In this case, the vacuum-type brake booster device 31 is mounted to the fire wall 3 by a bolt 32 extending through a flange of the master cylinder 30. An input shaft 33 of the brake booster device 31 extends rearwardly, in substantially the same manner as in the first-described embodiment The input shaft 33 cooperates with a valve mechanism 35 disposed in a valve body 34 through which the shaft of the master cylinder 30 slidably passes.

When the brake pedal is depressed, the input shaft 33 is moved to operate the valve mechanism 35 to control the amount of communication between a chamber 38, located to the rear of the pressure receptive surface 40 of a diaphragm 39, through a filter 36 to the atmosphere Accordingly, a power piston 41 is moved, transmitting its force to a reaction disc 42, a plate member 43 and output shaft 44.

As seen in FIG. 6, the shell 37 of this embodiment of the brake booster device has a shape similar to that of the first-described embodiment. That is, the shell 37 has an indented portion 46 having an edge falling along a chord offset by a distance l from the edge of the circle defined by the other portions of the shell 37. This results in an offset δ of the effective center of the pressure receiving surface of the diaphragm of the device from the center B of the circle to a position A As in the first-described embodiment, this permits the master cylinder 30 to be mounted offset from the center of the circle. Accordingly, the ease of mounting of the device is improved and interference with the mounting of other components inside the engine compartment is reduced.

I claim:
1. A vacuum-type brake booster device for automotive use comprising: a shell, an operating diaphragm mounted in said shell, an input shaft, an output shaft and a master cylinder, said shell and said diaphragm having a shape in a plane of said diaphragm having symmetry along no more than one axis lying in said plane, and said input shaft, said output shaft and said master cylinder having central longitudinal axes aligned with an effective pressure center point on said diaphragm, wherein the shape of said shell and said diaphragm is that of a circle having cut therefrom at least one segment defined by at least one chord offset from a center of said circle.

2. The vacuum-type brake booster device of claim 1, wherein said master cylinder is mounted on a front side of said shell.

3. The vacuum-type brake booster device of claim 1, wherein said master cylinder is mounted at a rear side of said shell.

* * * * *